United States Patent [19]
Dudley

[11] Patent Number: 5,722,604
[45] Date of Patent: Mar. 3, 1998

[54] METAL SCRAP SHREDDER

[76] Inventor: Russell D. Dudley, 3916 Old Field Trail, Kalamazoo, Mich. 49008

[21] Appl. No.: 423,679

[22] Filed: Apr. 18, 1995

[51] Int. Cl.$^6$ .............................. B02C 18/06; B02C 18/22
[52] U.S. Cl. ................................. 241/24.11; 241/24.13; 241/27; 241/186.5; 241/246
[58] Field of Search ........................... 241/24.13, 24.11, 241/186.5, 246, 248, 260.1, 27

[56] References Cited

U.S. PATENT DOCUMENTS

| | | |
|---|---|---|
| 1,046,678 | 12/1912 | Thiesing . |
| 1,159,822 | 11/1915 | Bartholomew . |
| 1,691,196 | 11/1928 | Jirotka . |
| 1,713,719 | 5/1929 | Severson . |
| 1,980,193 | 11/1934 | Finegan . |
| 2,064,666 | 12/1936 | Krushel . |
| 2,440,171 | 4/1948 | Eldridge . |
| 2,498,143 | 2/1950 | Struckmann ............... 241/186.5 X |
| 2,867,385 | 1/1959 | Martin . |
| 2,903,192 | 9/1959 | Clausen .................. 241/248 X |
| 3,035,621 | 5/1962 | Burcham . |
| 3,400,827 | 9/1968 | Ziherl . |
| 3,697,005 | 10/1972 | Lundin et al. . |
| 3,841,465 | 10/1974 | Miller, Jr. et al. . |
| 3,845,909 | 11/1974 | Johansson . |

(List continued on next page.)

OTHER PUBLICATIONS

Exhibit A entitled "Steimel Crusher" is a product description and drawing, published by Steimel Company, publication date unknown, discloses a long chip crusher. (No Date Given).

Exhibit B entitled "How the PRAB Vertical Axis Crusher Works," published by PRAB Company, publication date unknown, discloses a vertical axis chip crusher. (No Date Given).

Exhibit C entitled "Reclamet system adds value . . .." published by Reclamet Company, publication date unknown, discloses an automatic chip processing system including a shredder. (No Date Given).

Exhibit D entitled "Construction Features Worth Looking Into," published by American Pulverizer, publication date unknown, discloses a chip crusher. (No Date Given).

Exhibit E entitled "State of the Art Solutions—For All your Chip Processing Needs," published by Chip Systems International, assignee of the present application, published in 1994, discloses chip handling systems including a conveyor and shredder on pp. 2, 11 and 12, and a screw conveyor with a U-shaped housing on pp. 21 and 22.

*Primary Examiner*—John M. Husar
*Attorney, Agent, or Firm*—Price, Heneveld, Cooper, DeWitt & Litton

[57] ABSTRACT

A shredder is provided for shredding agglomerated metal scrap from a machining process. The shredder includes a rotatable shredding tool mounted on a drive shaft that is rotated using conventional power transmission devices. The axis of the shredder drive shaft is approximately in-line with the drive shaft of a feed device that delivers metal scrap to be shredded to the rotating shredding tool. The shredding tool is rotated so that the teeth of the shredding tool tear against the leading edge of the agglomerated metal scrap. Optionally, fixed hooks are located on one or both of the feed device and the shredder housing for engaging the agglomerated metal scrap. Where fixed hooks or anchors are used, the rotating tool engages the agglomerated metal scrap and spins the metal scrap against the fixed hooks, thus causing further shredding to occur. The shredding tool may be spring-loaded for axial movement in such a way as to allow it to move away from an object that causes it to jam. Also, alternatively, the shredding tool is reversibly rotatable, and the shredding tool teeth are oriented so that the shredding tool kicks away and unjams when reversibly rotated. In one form, the teeth on the shredding tool are flexible finger-like members that extends axially toward and engage the metal scrap as the scrap is output from the feed device.

48 Claims, 9 Drawing Sheets

U.S. PATENT DOCUMENTS

| | | |
|---|---|---|
| 3,888,427 | 6/1975 | Derouinea . |
| 4,085,899 | 4/1978 | Boothe . |
| 4,135,659 | 1/1979 | Derton et al. . |
| 4,140,282 | 2/1979 | Steimel . |
| 4,203,556 | 5/1980 | Krysiak et al. . |
| 4,219,410 | 8/1980 | Herder et al. . |
| 4,241,882 | 12/1980 | Baikoff . |
| 4,274,786 | 6/1981 | Svensson et al. . |
| 4,310,417 | 1/1982 | Dudley et al. . |
| 4,377,259 | 3/1983 | Areaux et al. . |
| 4,382,858 | 5/1983 | Dudley . |
| 4,423,844 | 1/1984 | Sours et al. . |
| 4,424,891 | 1/1984 | Dudley et al. . |
| 4,441,995 | 4/1984 | Dudley . |
| 4,529,134 | 7/1985 | Williams . |
| 4,630,658 | 12/1986 | Arola et al. . |
| 4,690,337 | 9/1987 | Stiefel . |
| 4,721,257 | 1/1988 | Williams et al. . |
| 4,881,862 | 11/1989 | Dick ................................. 241/246 X |
| 4,889,428 | 12/1989 | Hodson . |
| 4,925,116 | 5/1990 | Lundell . |
| 5,090,628 | 2/1992 | Porter . |
| 5,106,487 | 4/1992 | Nemedi . |
| 5,232,607 | 8/1993 | Lundquist . |
| 5,248,100 | 9/1993 | Arakawa . |

METAL SCRAP SHREDDER

BACKGROUND OF THE INVENTION

The present invention relates to shredders, and more particularly to an apparatus for shredding agglomerated metal scrap.

Agglomerated scrap material is a natural byproduct of metal machining operations. Typically, the agglomerated scrap material is laden with liquid used to lubricate and cool cutting tools performing the machining operations. It is important to recover and reuse as much of the liquid as possible since the liquid is expensive, and further since it can be difficult and expensive to dispose of scrap including the liquid in an environmentally safe manner. However, recovery of the liquid is not easily accomplished since the agglomerated scrap material includes twisted and entangled metal strips and turnings that form multiple pockets and recesses for holding the liquid.

Centrifuges are often used to separate the liquid from the agglomerated scrap material, however the agglomerated scrap material forms a tangled interconnected mass that is difficult to process through a centrifuge. Shredders are used to break up the tangled, agglomerated mass of scrap material. However, large objects such as nuts, bolts, chunks of stock material, and the like cause known shredders to frequently jam, thus stopping the centrifuge operation until the shredder is unjammed. Further, known shredders are expensive to maintain and keep up, and still further frequently jam even where there are no large objects. Also, known shredders are difficult to clean, and thus metal scrap being processed therethrough becomes contaminated by remanent pieces of metal scrap materials left from materials previously processed. Still further, many known shredders are less energy efficient than desired. More specifically in regard to known shredders, most scrap shredding devices currently in use for shredding agglomerated metal scrap from machining operations fall into one of four types - a three roll pierce-and-tear shredder, a rotating arm shredder, a two shaft rotary shear shredder with overlapping rotary shear/cutter wheels and a hammermill. The three roll pierce and tear shredder is complicated, expensive and tends to jam severely on oversize objects such as metal bar stock or large metal objects often found in the scrap. It also often fails to reduce the agglomerated material to a size small enough to allow for subsequent efficient processing. The rotating arm shredder is also complicated, expensive and jams severely on oversize objects. Some models of the rotating-arm-type shredders have automatic jammed object ejection, but they are somewhat limited in the size of object that can be ejected and also they tend to be unreliable. The rotary shear shredder having overlapping rotary shear/cutter wheels is complicated, expensive and subject to high wear since the operating concept is that of shearing. Edges of the cutter wheels quickly loose their cutting edge, which reduces shredding efficiency and increases the tendency to jam. Further, repairing and/or replacement of the cutter wheels is expensive and time consuming. The hammermill is expensive, has high operating costs, is noisy, and is prone to jamming unless it is oversized. Also, the cost of installation is high since it requires a special foundation.

Therefore, a metal scrap shredder is desired solving the aforementioned problems.

SUMMARY OF THE INVENTION

The present invention includes an apparatus for shredding agglomerated metal scrap material from a machining operation or the like. The apparatus includes a conveyor housing defining an outlet opening and an output direction. A metal scrap shredder includes a shredder housing positioned at an outlet end of the conveyor housing and further includes a tool having a plurality of teeth located proximate the outlet opening, the teeth being rotatable about an axis of rotation extending into the output opening. The teeth are configured to tear apart and shred the agglomerated metal scrap as the scrap is output from the outlet opening. A centrifuge is positioned to receive shredded metal scrap from the shredder. In a preferred form, the output opening is located at an axial end of the conveyor housing.

The preferred embodiments of the present invention include numerous advantages over known shredders. They are relatively uncomplicated, low cost, and reliable, yet they can be operated with minimal horsepower. Further, jamming problems are reduced or eliminated, even with materials that are difficult to shred or that contain many oversized chunks of material. In addition to the aforementioned advantages, the preferred embodiments advantageously do not require special foundations, and they are relatively quiet in operation. Further, tooling can be readily changed to meet specific performance requirements, and maintenance frequency and also downtime is minimized.

These and other features, advantages and objects of the present invention will be further understood and appreciated by those skilled in the art by reference to the following specification, claims and appended drawings.

BRIEF DESCRIPTION OF THE DRAWINGS

FIG. 1 is a side elevational view of a material handling apparatus embodying the present invention for handling agglomerated metal scrap material from a machining operation or the like;

DESCRIPTION OF A PRIOR ART APPARATUS

Figure 25:
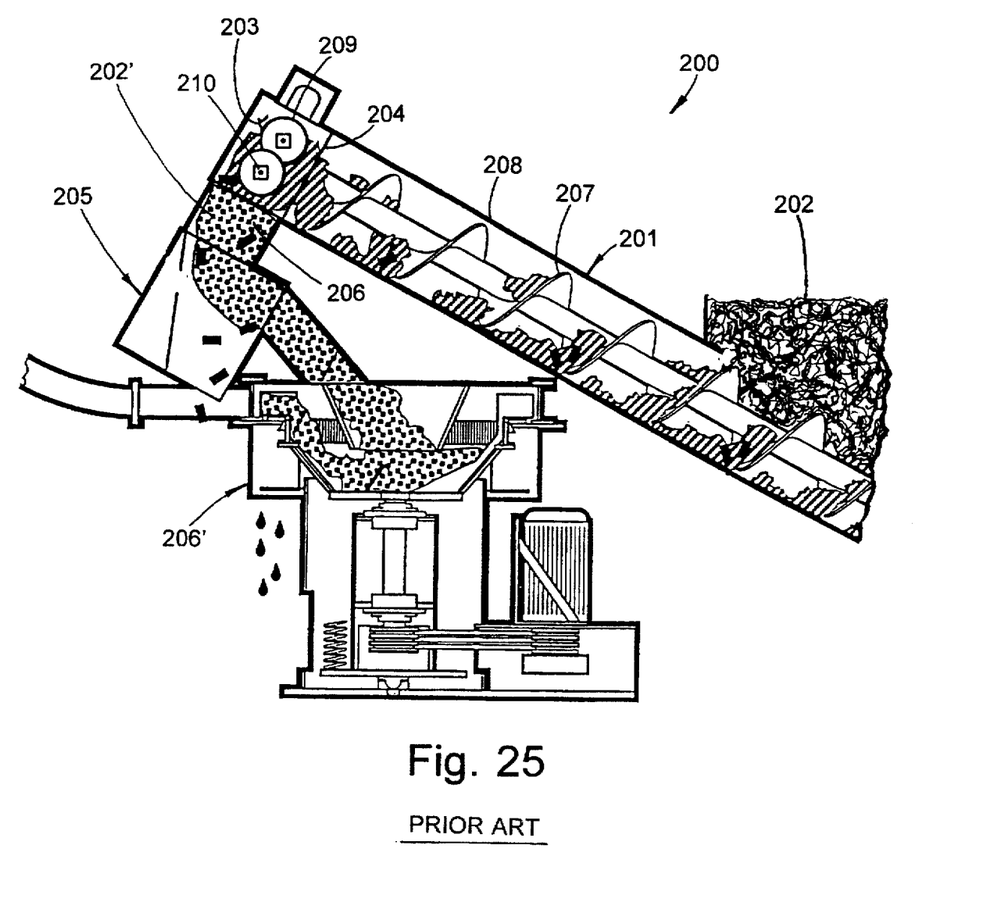
FIG. 25 is a side elevational cross-sectional view of a prior art material handling apparatus including a shredder.

A prior art apparatus 200 (FIG. 25) includes a screw conveyor 201 for delivering liquid laden agglomerated scrap material 202, a shredder 203 attached to a discharge end 204 of the screw conveyor 201, a large object separator 205 attached a discharge outlet 206 of the separator 205, and a centrifuge 206' for centrifugally separating liquid from the scrap material 202' after it has been shredded. The screw conveyor 201 includes a screw 207 positioned in a U-shaped housing 208, and shredder 203 includes overlapping rotating shearing wheels 209 and 210 that receive the agglomerated scrap material 202 from the screw 207 and that shearingly shred the scrap material 202. The axis of rotation of the shearing wheels 209 and 210 is generally perpendicular to conveyor 201 and is thus also perpendicular to the path of scrap material 202 as the scrap material 202 flows out of the screw conveyor 201. After shredding, the liquid laden shredded scrap material 202' then drops through the separator 205 and is deflected and/or blown into the centrifuge 206'.

DETAILED DESCRIPTION OF PREFERRED EMBODIMENT

Figure 1:
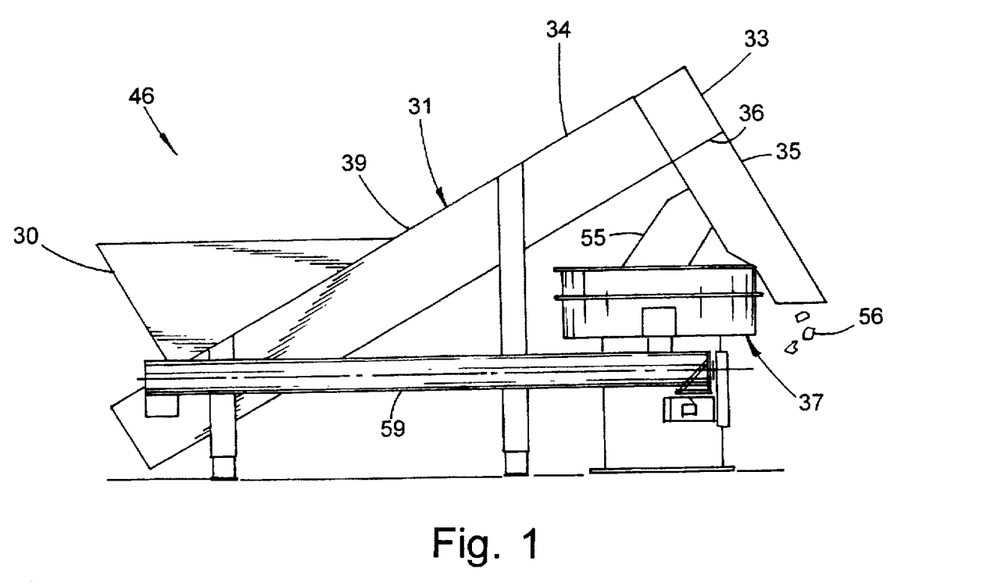
Figure 2:
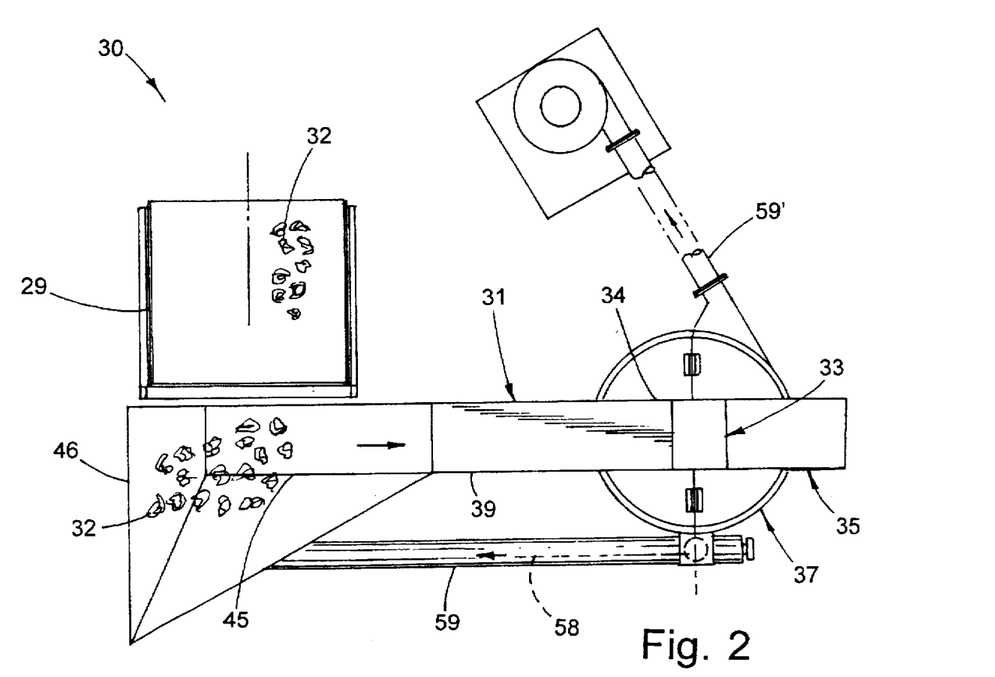
FIG. 2 is a plan view of the material handling apparatus shown in FIG. 1.

A material handling apparatus 30 (FIGS. 1-2) embodying the present invention is provided for separating liquid from liquid laden agglomerated metal scrap material 32, such as twisted metal turnings, stringers and elongated chips from a machining operation. The material handling apparatus 30 includes a metal scrap feed conveyor 31 having a screw or auger 38 for handling liquid laden agglomerated scrap material 32, a shredder 33 attached to a discharge end 34 of the screw conveyor 31, a large object separator 35 attached to the shredder outlet 36 for ejecting large objects in the agglomerated scrap material 32, and a centrifuge 37 positioned generally below the separator 35. The centrifuge 37 is configured to receive and centrifugally separate liquid from scrap material 32 shredded by shredder 33. By shredding the agglomerated scrap material, a higher percentage of the liquid can be recovered from the scrap material, which is important since the liquid is expensive, is recyclable, and is an environmental pollutant if not properly disposed of. Further, "dry" and clean shredded metal scrap is easier to reprocess, and can be resold at a higher price. The present material handling apparatus 30, and in particular shredder 33, facilitates this by providing a relatively low cost and maintainable shredding device that has a reduced tendency to jam. Further, the tool of the shredder can be readily cleaned or changed to prevent contamination of a later batch of scrap material from an earlier processed batch of scrap material. Still further, the present shredder 33 is adaptable for use with shredder tools adapted to process different agglomerated scrap materials, thus allowing an optimal shredder tool to be selected for different scrap materials. Also, shredder 33 has a relatively low energy consumption per cubic foot of shredded scrap material.

Screw conveyor 31 includes a conveyor housing 39 (FIG. 3) that is generally U-shaped (see FIGS. 22–23), and includes a first end 45 that extends into a supply bin 46 filled with agglomerated scrap material 32. The conveyor screw 38 is rotatably positioned in conveyor housing 39, and includes a first exposed end 47 that extends into supply bin 46 for biting into and augering agglomerated scrap material from supply bin 46. Scrap material 32 is transported to supply bin 46 automatically by other conveyors (not shown) or in a batch-type arrangement using gondolas 29. The second end 48 of screw 38 extends to the discharge end 34 of conveyor 31. Screw 38 comprises a shaft 49 and a flange 50 that extends spirally around shaft 49 from first end 47 to second end 48. Flange 50 is configured to push the agglomerated scrap material 32 internally along conveyor housing 39 as the screw 38 is rotated.

Figure 3:
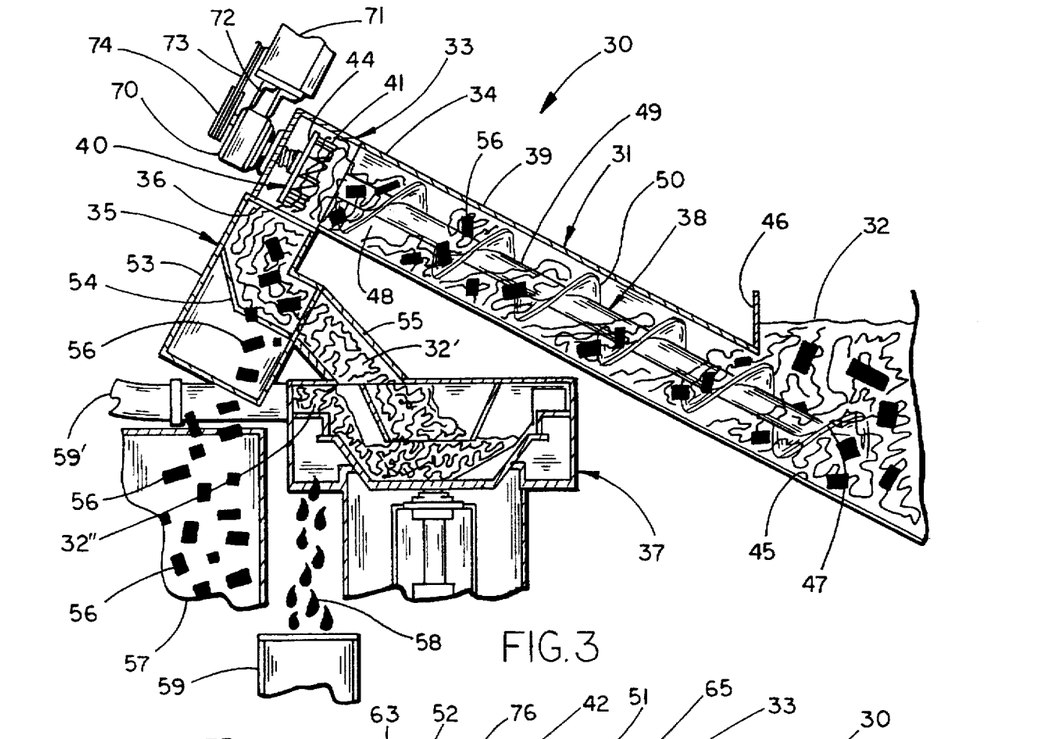
FIG. 3 is an enlarged fragmentary side cross-sectional view of the material handling apparatus shown in FIG. 1.

The shredder 33 includes a tool 40 having teeth 41 positioned proximate and oriented toward the discharge end 34 of the conveyor 31. The teeth 41 are configured to bite into and shred the scrap material 32 as the scrap material 32 flows out of the discharge end 34 of the screw conveyor. The orientation of the rotating teeth 41 allows the teeth 41 to tear and shred the agglomerated scrap material 32 against the intertwined agglomerated scrap material 32 still engaged by the screw 38. Further, the teeth 41 tear and shred the scrap material 32 against the end of the screw 38 itself. An experimental system was constructed with a screw having a diameter of about 18". The screw was operated at about ½ RPM such that it advanced agglomerated scrap material at about 1 foot per minute. In the experimental system, tool 40 was rotated at about 40–50 RPM. However, it is contemplated to be within the present invention to utilize different screw sizes and speeds, and also to utilize different tool speeds depending on the characteristics of the scrap material and the speed and size Of conveyor screw. The teeth 41 shown in FIG. 3 are triangularly-shaped such that, if reversed, the teeth 41 reject and/or "kick away" from any item causing them to jam. Further, the teeth 41 are mounted on a plate 44 that is axially movable and/or clutched to prevent damage to the tool 40 from shocks and vibrations experienced when or if the tool 40 jams.

Figure 4:
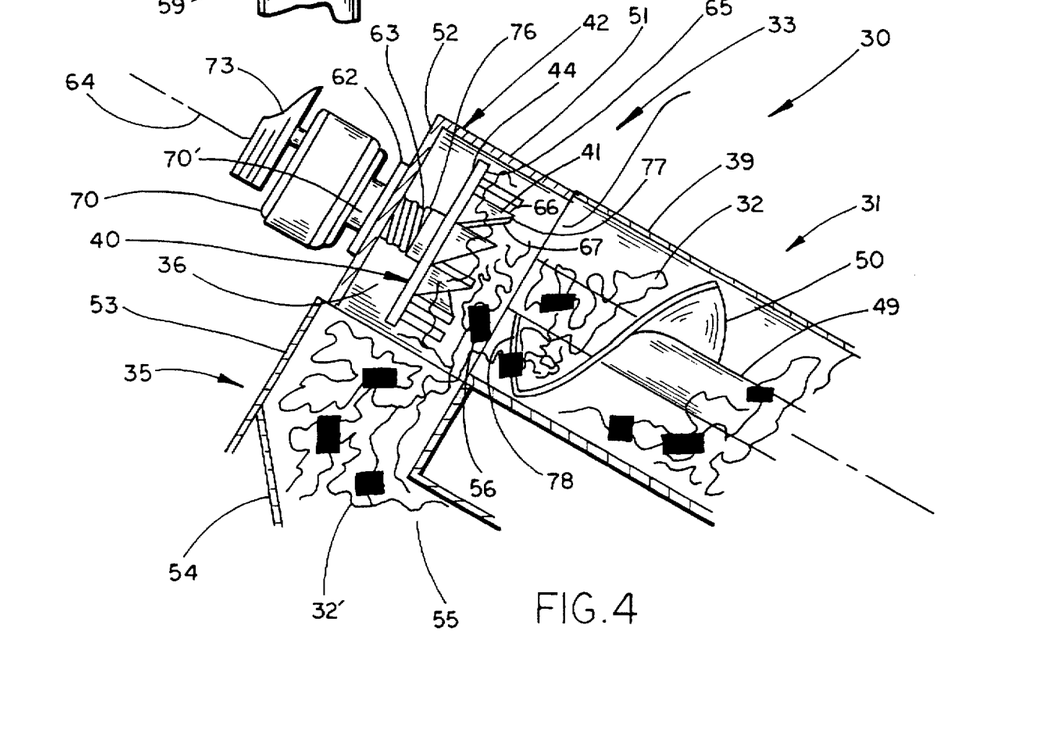
FIG. 4 is an enlarged fragmentary side cross-sectional view of the apparatus shown in FIG. 3.
Figure 5:
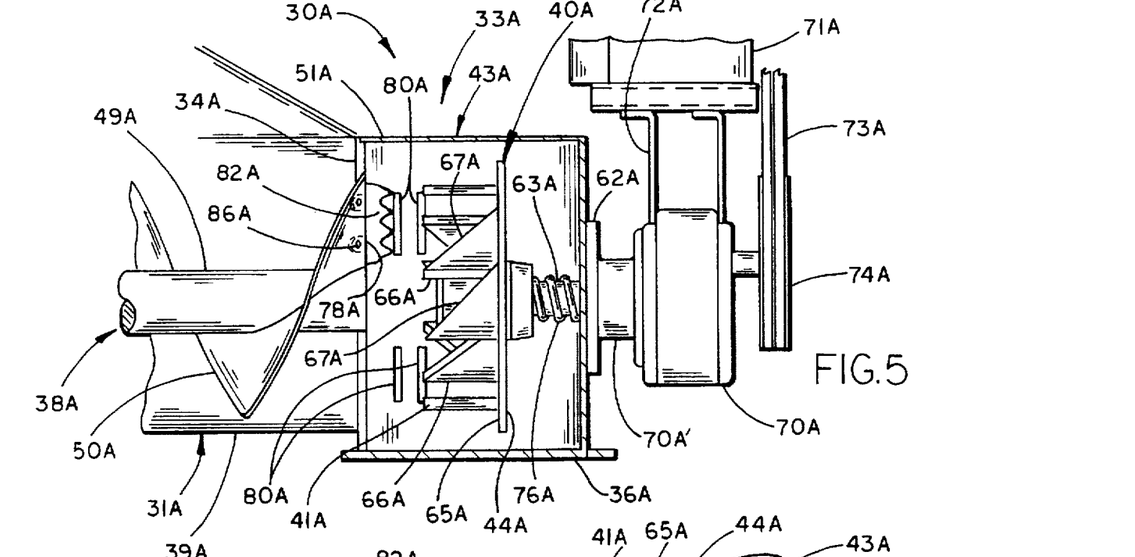
FIG. 5 is a fragmentary side cross-sectional view of a second modified material handling apparatus including a modified agglomerated metal scrap shredder embodying the present invention.
Figure 6:
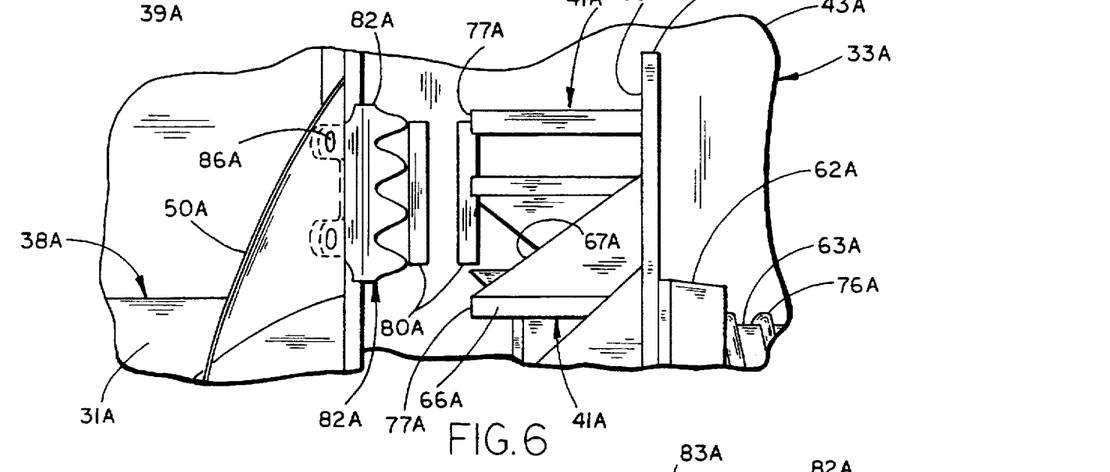
FIG. 6 is an enlarged fragmentary side view of the apparatus shown in FIG. 5.
Figures 7, 7A:
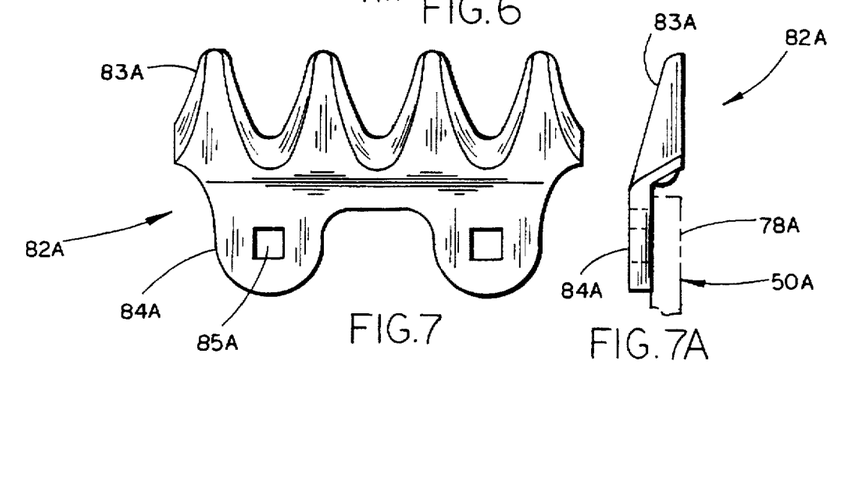
FIGS. 7 and 7A are plan and side views, respectively, of the rake attached to an end of the screw.

Shredder housing 42 (FIG. 4) is generally rectangularly-shaped, and is generally somewhat larger than the output end of conveyor housing 39. Shredder housing 42 includes a side wall 51 and a back wall 52. Side wall 51 is attached to the end of conveyor housing 39, and defines an open end aligned with the discharge outlet 34 of conveyor 31. The shredder discharge outlet 36 is an opening defined in the bottom of side wall 51. Shredded scrap material 32' falls through discharge outlet 36 by gravity and also is thrown through discharge outlet 36 by the action of shredder tool 40. Notably, it is contemplated that different shredder housing shapes are possible, such as to satisfy particular needs of special or particular application. Notably, shredder housing 42 need not be attached to conveyor housing 39, but instead can be supported at the end of conveyor housing 42 by other means.

Shredder 33 (FIG. 4) includes a shaft 63 that extends through back wall 52 and that is rotatably supported by back wall 52 on a bearing 62. Shaft 63 is generally axially aligned with screw shaft 49, and defines an axis of rotation 64 for shredder tool 40. The plate 44 is secured for rotational movement with shaft 63 on an end of shaft 63. Plate 44 is spaced from back wall 52 and also from discharge outlet 36. A circular array of the triangularly-shaped teeth 41 are secured to the face 65 of plate 44. Teeth 41 include a leading edge 66 that is perpendicular to face 65 and that is generally aligned with axis 64. Teeth 41 further include a trailing edge 67 that extends at an angle of about 45 degrees to axis 64. Teeth 41 are spaced radially around axis 64 on plate 44 as desired. In the illustrated arrangement, four inner teeth and four outer teeth are positioned alternatingly around axis 64. However, it is noted that various teeth arrangements are possible, and further that particular teeth arrangements may be advantageous for particular types of agglomerated scrap materials, depending on the strength of the entangled agglomerated scrap material, the degree to which the scrap material is contaminated with large objects, the speed with which the shredder 33 will operate, and other characteristics of the agglomerated scrap material and material handling system.

A drive mechanism for rotating shredder tool 40 includes a speed reduction device 70 (FIG. 4) operably connected to an end of shaft 63 opposite tool 40. Speed reduction device 70 is mounted on a stand 70' attached to shredder housing 43, although it can be supported to other structures around the shredder 33. Drive mechanism further includes a motor such as an electric motor 71 (FIG. 3) or other powering device. The motor 71 is secured to speed reduction device 70 by brackets 72. Drive belts 73 are extended between pulleys on the motor 71 and pulley 74 on the speed reduction device 70 to drive speed reduction device 70. Brackets 72 are adjustable so that the tension of drive belts 73 can be adjusted.

Shredder tool 40 (FIG. 4) is particularly suited to reduce and/or eliminate the tendency to jam, and further to reduce the time required to unjam the shredder 33 should a jam occur. Shredder plate 44, i.e. tool 40, is movably mounted on shaft 63 for axial movement in the event that a large object 56 is encountered or in the event that large amounts of agglomerated scrap material 32 are being fed into shredder 33. A spring 76 positioned on shaft 63 between plate 44 and bearing 62 biases plate 44 to an extended position. The outer edge 77 of teeth 41 are positioned proximate the discharge edge 78 of screw flange 50 when plate 44 is in the extended position such that teeth 41 are spaced from but are positioned proximate screw flange edge 78. As tool 40 is rotated, the agglomerated scrap material 32 is torn and sheared by the action of teeth 41 passing screw flange edge 78. Also, the teeth 41 tear and shear the agglomerated scrap material being discharged from the screw conveyor 31 against the agglomerated scrap material still in the screw conveyor 31 which is retained in conveyor 31 in part by the screw flange 50. Shredder tool 40 drops the shredded scrap material 32' downwardly into the discharge outlet 36 of shredder 33 and into a deflector 54 in large object ejector 35.

Large object ejector 35 (FIG. 3) includes an ejector housing 53 attached to shredder side wall 51 below shredder discharge outlet 36. The deflector 54 located in large object ejector 35 deflects the shredded scrap material 32' toward a chute 55 that conveys the shredded scrap material 32' into the centrifuge 37. Large objects 56 fall through a side chute in ejector 35 into a collection bin 57 so that they can be removed. Liquid 58 is separated from the shredded chips in centrifuge 37, and the liquid 58 is moved along tube 59 to a collection tank (not specifically shown). The "dry" shredded material 32" is blown from centrifuge 37 to a conveniently located collection bin (not specifically shown) along a tube 59'. Large object ejectors and centrifuges, such as ejector 35 and centrifuge 37, are generally known in the art, such that a detailed disclosure is not required herein for an understanding of the present invention.

If tool 40 does become jammed, the rotation of tool 40 can be reversed so that the angled trailing edges 67 (FIG. 4) of teeth 41 engage the agglomerated scrap material causing the jam. This causes tool 40 move axially toward back wall 52 on shaft 49 due to the ramping action of angled edges 67 against the jammed material. In effect, the teeth 41 of tool 40 "kick away" the scrap material causing the jammed condition. At the same time, the teeth 41 continue to provide a shredding action as they engage the agglomerated material. Notably, the axial movement also occurs as the tool 40 begins to become jammed, particularly where a large object is encountered. This axial movement reduces the shock of engaging a large object, .and thus reduces damage to the teeth 41, to the tool 40 and to the drive mechanism 70, 71, 72 and 73 (FIG. 3).

Various modified material handling apparatus are disclosed in FIGS. 5-20. To reduce repetitive and redundant discussion, comparable and identical features and components are identified by the same number but with the addition of the letters "A," "B," "C" and etc. New features are also identified with the same letters "A," "B," "C" and etc. to be consistent within a given drawing.

Material handling apparatus 30A (FIGS. 5-6) includes a plurality of anchors or teeth 80A positioned around the inside of shredder housing side wall 51A. Anchors 80A are positioned proximate the discharge end 34A of screw conveyor 31A and off the end of teeth 41A so that they do not interfere with the rotation of tool 40A. The illustrated anchors 80A are arranged in pairs, and are spaced around the housing side wall 51A at a predetermined spacing. The spacing of anchors 80A may or may not be regular, and further may or may not be offset or different from the spacing of teeth 41A. For example, a different spacing of anchors 80A would be used where an unacceptable amount of performance would be caused by the teeth 41A simultaneously passing two adjacent anchors 80A. Anchors 80A include relatively sharp leading and trailing edges, although it is contemplated that various shaped anchors are within the scope of the present invention. For example, it is contemplated that anchors 80A could be replaced with flexible fingers not unlike flexible teeth 110G described below.

Figure 8:
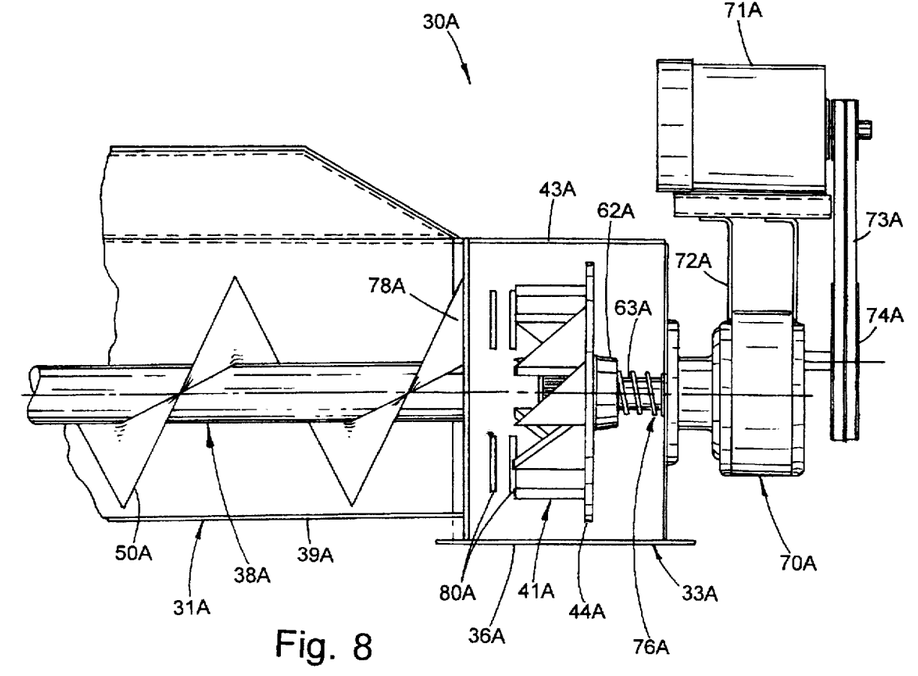
FIG. 8 is a fragmentary side cross-sectional view of the second modified material handling apparatus shown in FIG. 5 embodying the present invention, but with the rake on the screw removed.
Figure 9:
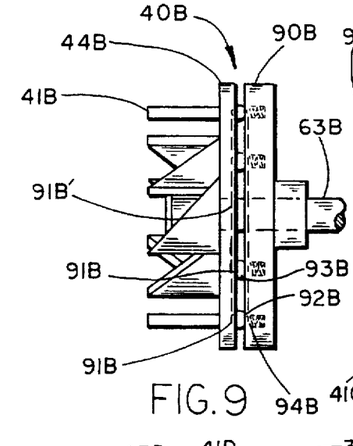
FIG. 9 is a side view of a third modified shredder tool embodying the present invention.
Figure 9A:
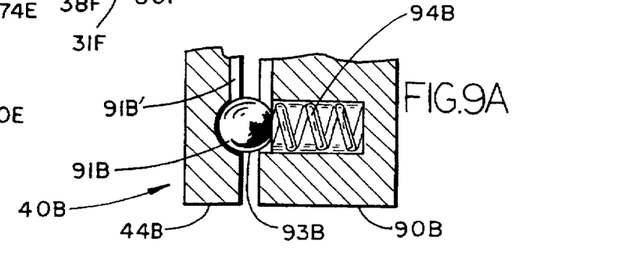
FIG. 9A is an enlarged fragmentary cross-sectional view of the detent mechanism shown in FIG. 9.
Figures 10, 11:
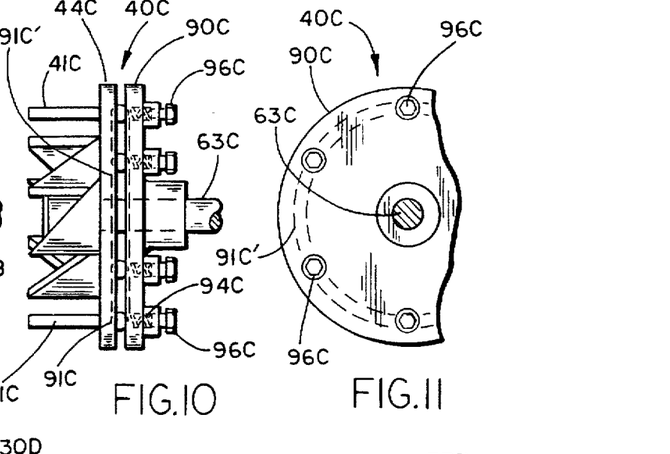
FIG. 10 is a side view of a fourth modified shredding tool embodying the present invention.
FIG. 11 is an end view of the shredding tool as shown in FIG. 10.
Figure 12:
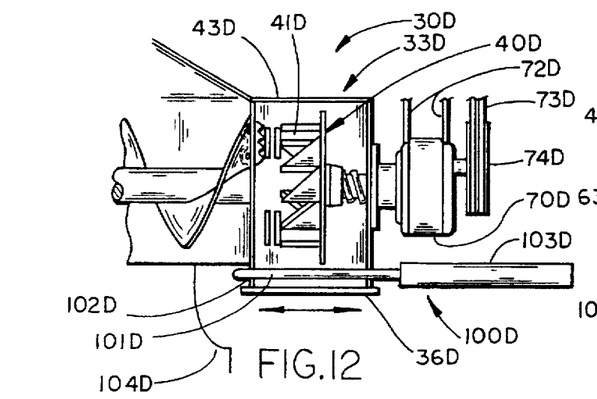
FIG. 12 is a fragmentary side cross-sectional view of a fifth modified material handling apparatus including another modified shredder embodying the present invention.
Figure 13:
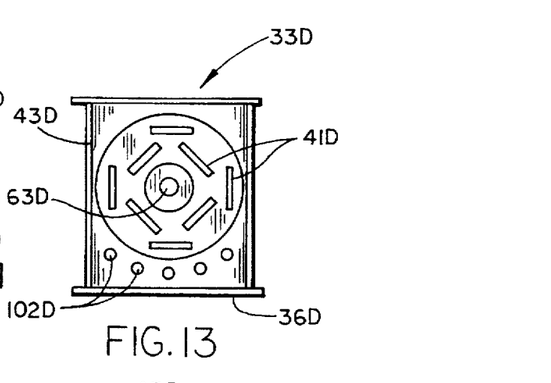
FIG. 13 is an end view of the shredder shown in FIG. 12 including the shredding plate, the shredding teeth and the shredder housing.
Figure 14:
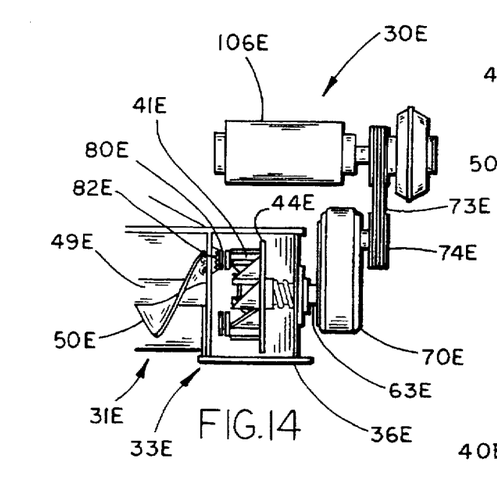
FIG. 14 is a side cross-sectional view of a sixth modified material handling apparatus including another modified shredder embodying the present invention.
Figure 15:
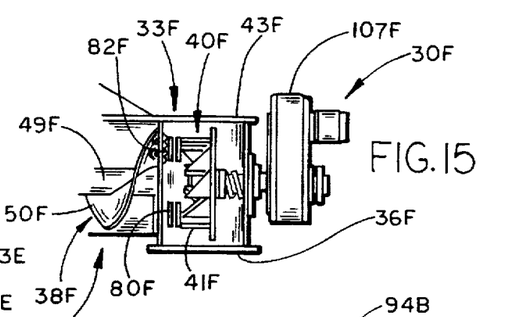
FIG. 15 is a fragmentary side cross-sectional view of a seventh modified material handling apparatus including another modified shredder embodying the present invention.

A toothed rake or second anchor 82A is attached proximate the discharge edge 78A of screw flange 50A. Rake 82A (FIGS. 7-7A) includes fingers or teeth 83A that extend into shredder housing 43A from screw 38A. A mounting flange 84A on rake 82A includes holes 85A to permit attachment of rake 82A to screw flange 50A by bolts 86A. Rake mounting flange 84A is offset from fingers 83A so that rake fingers 83A generally align with screw flange 50A. Thus, fingers 83A align with screw flange 50A and do not tend to catch on agglomerated scrap material 32A. As shown in FIG. 8, rake 82A can be removed from material handling apparatus 30A while still providing an operable arrangement. It is contemplated that rake 82A can be secured to flange 84A by a spring-loaded bolt arrangement to permit some flipper-like flexing movement by rake 82A ff a large object is encountered. Other alternatives are also contemplated to be within the scope of the present invention, such as the replacement of rake 82A by a flexible finger not unlike flexible teeth 110G described below.

Shredder tool 40B (FIGS. 9–9A) incorporates a release mechanism or clutch mechanism for further reducing the shock of engaging a large object. In tool 40B, a backup plate 90B is mounted on drive shaft 63B behind teeth-supporting plate 44B. Teeth-supporting plate 44B and backup plate 90B include a series of depressions 91B and 92B, respectively, with depressions 91B being interconnected by a circular raceway 91B'. The depressions 91B and 92B face each other, and a plurality of ball bearings 93B are positioned between plates 44B and 90B for engaging depressions 91B. Springs 94B are located in depressions 92B for biasing ball bearings 93B into an engaged/detented position in depressions 91B. If tool 40B engages a large object or experiences high shear, ball bearings 93B move into depressions 92B against springs 94B. This allows the ball bearings 93B to move out of depressions 91B into raceway 91B'. Thus, clutch mechanism releases teeth-supporting plate 44B, allowing plate 44B to rotate relative to plate 90B, which prevents damage to shredder tool 40B and to the drive mechanism. Shredder tool 40C (FIGS. 10–11) is comparable to shredder tool 40B, except that the tension of springs 94C are adjustable by rotating spring-engaging screws 96C that extend through the back side of plate 90C. Notably, several variations of clutch mechanisms are contemplated to be within the scope of the present invention, such as friction-brake-shoe-type mechanisms, shear-pin-type mechanisms, magnetic release mechanisms, and the like.

Material handling apparatus 30D (FIGS. 12–13) includes a scrap-output-limiting mechanism 100D for limiting the size of shredded agglomerated scrap material exiting shredder 33D. Scrap-output-limiting mechanism 100D includes a series of elongated fingers 101D that extend transversely across discharge outlet 36D and into apertures 102D of shredder housing 43D. A reciprocatable actuator 103D is operably connected to fingers 101D. Actuator 103D periodically withdraws fingers from discharge outlet 36D to open discharge outlet 36D to prevent outlet 36D from becoming plugged from scrap material resting on fingers 101D. As the fingers 101D are re-extended across discharge outlet 36D, scrap material may engage the ends of fingers 101D. Notably, the ends of fingers 101D are rounded to reduce this tendency. However, a small chute 104D is located opposite actuator 103D to receive any scrap material pushed into the apertures 102D. Chute 104D directs any scrap material pushed into chute 104D back into the large object ejector 35D. Thus, actuator 103D can be actuated while the shredder continues to operate.

Material handling apparatus 30E (FIG. 14) and material handling apparatus 30F (FIG. 15) are substantially identical to material handling apparatus 30, with the exception that material handling apparatus 30E includes a fluid clutched electric motor 106E for powering the shredder, and material handling apparatus 30F includes a hydraulic motor 107E for powering the shredder.

Figure 16:
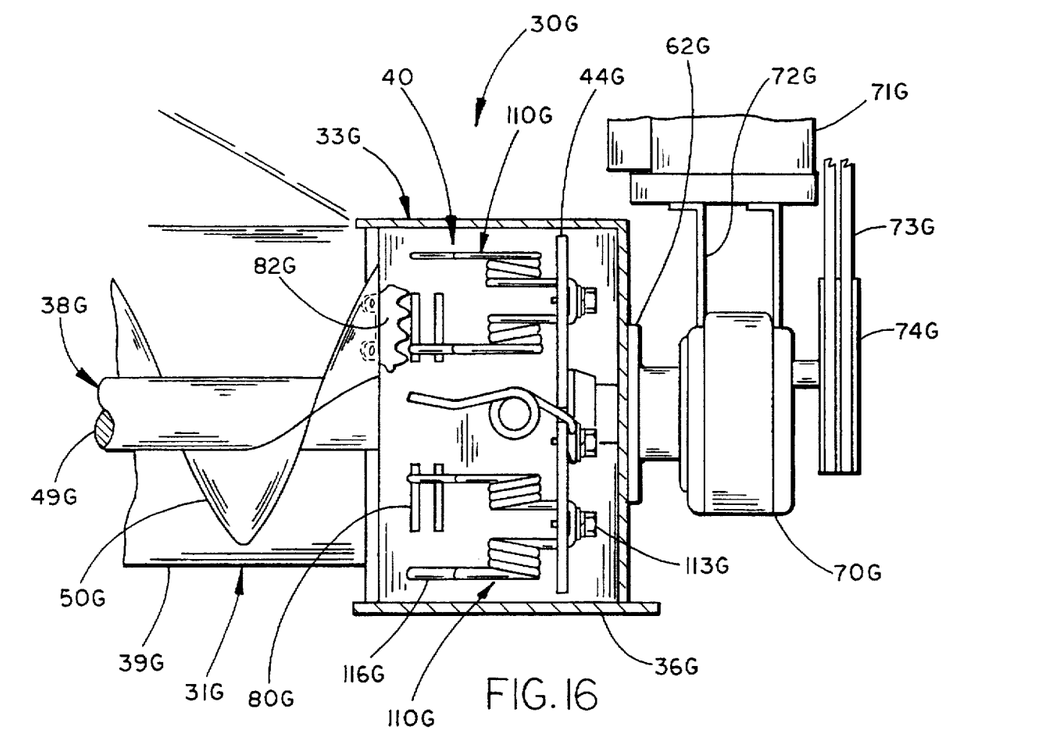
FIG. 16 is an enlarged fragmentary side cross-sectional view of an eighth modified material handling apparatus including another modified shredder embodying the present invention.
Figure 17:
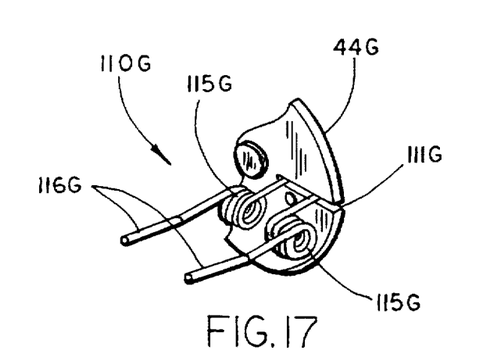
FIG. 17 is a fragmentary perspective view of a pair of the shredding teeth shown in FIG. 16.
Figure 18:
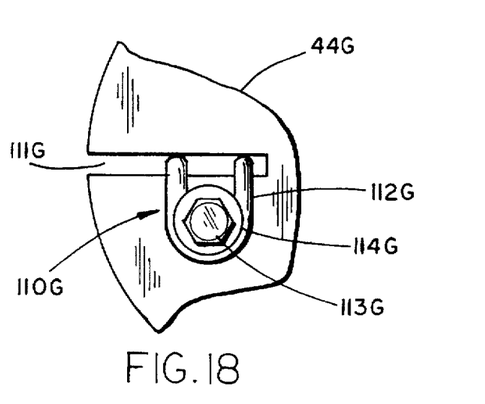
FIG. 18 is a fragmentary rear view of the shredder mounting plate and attachment for the shredder teeth shown in FIG. 16.
Figure 19:
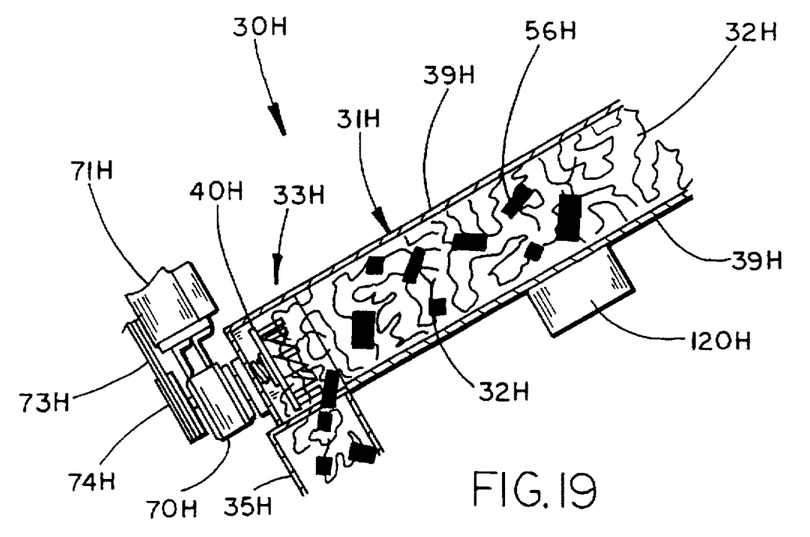
FIG. 19 is a fragmentary side cross-sectional view of a ninth modified material handling apparatus embodying the present invention, the apparatus including a vibrator.
Figure 20:
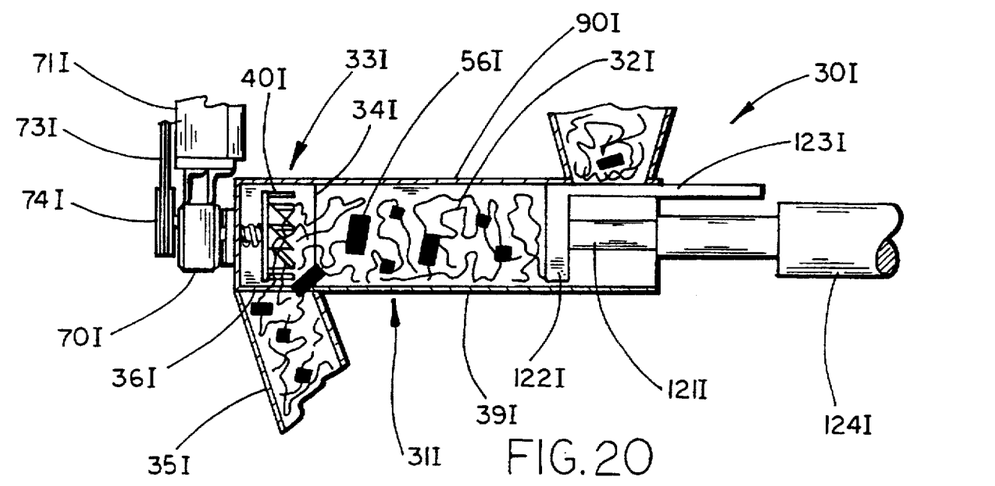
FIG. 20 is a fragmentary side cross-sectional view of a tenth modified material handling apparatus embodying the present invention, the apparatus including a reciprocatable plunger.

Material handling apparatus 30G (FIG. 16) includes a modified shredder 33G having a shredder tool 40G with flexible teeth 110G in place of rigid triangular teeth 41. (Compare to FIGS. 4–5). Modified shredder 33G (FIG. 16) is particularly useful where the agglomerated scrap material 32G is intertwined and interconnected, but where the strips in the scrap material are sufficiently short and/or brittle and/or otherwise relatively less strongly entwined to allow shredding with a relatively low amount of shear force. In apparatus 30G, teeth-supporting plate 44G (FIG. 17) includes slots 111G that extend radially to an edge of plate 44G. Flexible teeth 110G include a looped end 112G (FIG. 18) configured to fit through a selected slot 111G and extend adjacent the back surface of the plate 44G. A bolt 113G threadably engages plate 44G and a washer 114G positioned on bolt 113G engages the configured looped end 112G to clampingly retain the looped end 112G of the flexible teeth 110G to plate 44G. Flexible teeth 110G further include a pair of coiled sections 115G (FIG. 17) extending from opposing sides of looped end 112G, and a pair of resilient shredding fingers 116G that extend from each of coiled sections 115G toward screw conveyor 31G (FIG. 16). As fingers 116G engage the agglomerated scrap material being discharged from conveyor 31G, the scrap material is poked and shredded, and then discharged through shredder discharge outlet 36G. Numerous other flexible finger configurations and attachments are also contemplated to be within the scope of the present invention.

Material handling apparatus 30H (FIG. 19) includes an inclined, gravity-feed chute or housing 39H. A vibrator 120H is attached to chute 39H to vibrationally prevent the agglomerated scrap material from frictionally hanging up within chute 39H.

Material handling apparatus 30I (FIG. 20) includes a plunger or ram 121I positioned in conveyor housing 39I for pushing agglomerated scrap 32I along within the housing 39I toward shredder 33I. An actuator 124I moves the ram 121I back and forth, and includes a pushing end 122I for engaging scrap material 32I, and further includes an upper flange 123I for holding back the supply of agglomerated scrap material 32I when the ram 121I is in the extended position.

Figures 21, 22, 23:
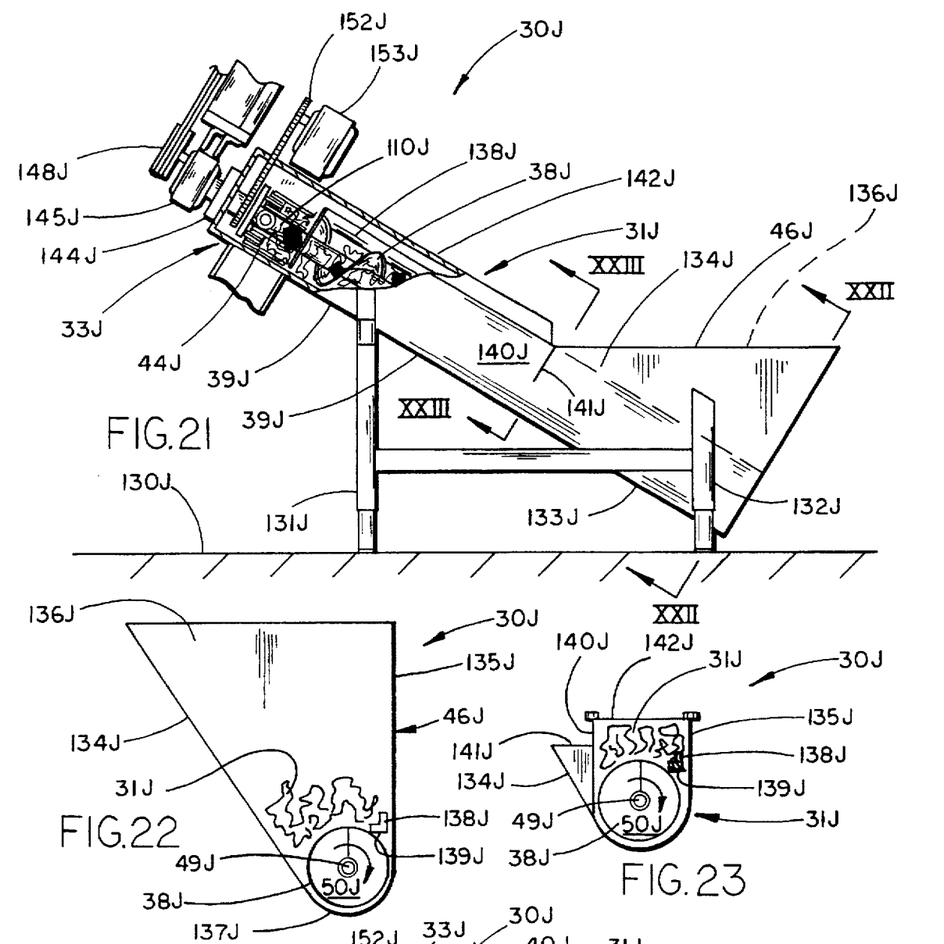
FIG. 21 is a fragmentary side view, partially broken away, of an eleventh modified material handling apparatus embodying the present invention.
FIGS. 22 and 23 are cross-sectional views taken along the lines XXII—XXII and XXIII—XXIII, respectively, in FIG. 21.

Material handling apparatus 30J (FIG. 21) includes a screw conveyor 31J, and a shredder 33J located in a discharge end section 34J of conveyor 31J. Conveyor 31J includes a feed device comprising a screw 38J positioned in a conveyor housing 39J. Conveyor housing 39J is supported at an angle to ground 130J by legs 131J and 132I. The lower end 133J of housing 39J is enlarged and defines a supply bin or hopper 46J. Hopper 46J has a U-shaped cross section defined by angled side wall 134J and vertical side wall 135J (FIG. 22). The top of side walls 134J and 135J define an enlarged opening 136J for receiving metal agglomerated scrap material dumped into hopper 46J. The bottom wall 137J of hopper 46J is arcuately-shaped for receiving screw 38J.

An L-shaped beam 138I is welded or otherwise secured to vertical side wall 135J. Beam 138J includes a generally horizontally extending leg 139J that protrudes from vertical side wall 135J generally tangentially toward screw 38J. Beam 138I extends longitudinally in conveyor 31J parallel screw 38J, and provides a structure for screw 38J to bite against as agglomerated scrap material is augered along conveyor 31J. In particular, beam 138J reduces the tendency of the agglomerated scrap material 32J to simply rotate or spin with screw 38J without moving longitudinally in conveyor housing 39J. Optionally, leg 139J extends toward the oncoming edge of screw flange 50J, but provides some clearance therewith such that, as agglomerated metal scrap is trapped between screw flange 50J and leg 139J, the scrap material is wedged against leg 139J and is guided along leg 139I along the length of conveyor 31J.

The angled side wall 134J of conveyor housing 39J ends at the outlet end 139J of hopper 46J (FIG. 21), and a second vertical side wall 140J extends from hopper outlet end 139J to shredder 33J (FIG. 23). A transverse wall 141J connects angle side wall 134J to second vertical side wall 140J. A cover 142J is bolted to the top edge of vertical side walls 135J and 140I to prevent items from accidentally falling into conveyor 31J.

Figure 24:
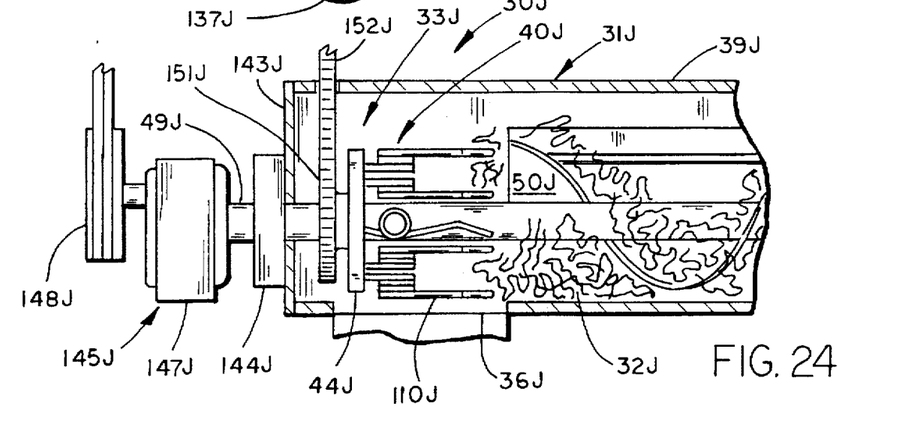
FIG. 24 is an enlarged fragmentary side cross-sectional view of the shredder and conveyor shown in FIG. 21.

The center shaft 49J (FIG. 24) of conveyor screw 38I extends through shredder tool 40J and projects through an end plate 143J on conveyor housing 39J. A bearing 144J rotatably supports shaft 49J on end plate 143J. A screw drive 145J is operably connected to the projecting end of screw shaft 49J. Screw drive 145J includes a speed reduction device 147J, and a belt-driven pulley 148J operably connected to speed reduction device 147J. Screw flange 50J terminates a distance short of end plate 143J to make room for tool 40J. Also, conveyor outlet/shredder outlet opening 36J is formed in housing bottom wall 137I proximate end plate 143J.

Shredder tool 40J (FIG. 24) includes flexible teeth 110J not unlike tool 40G (FIG. 16). However, it is noted that any of shredder tools 40–40I can be used in combination with the arrangement shown in FIG. 24. Further, anchors (see item 80A, FIG. 5), rakes (see item 82A, FIG. 5), scrap-output-limiting mechanisms (see item 100D, FIGS. 12–13), and other features previously described can also be incorporated into the arrangement shown in FIG. 24.

In apparatus 30J (FIG. 24), shredder tool 40J includes a plate 44J rotatably mounted on conveyor shaft 49J by an internal bearing. A sprocket 151J is connected to the back of plate 44J. A chain drive 152J extends through cover 142J and wraps around sprocket 151J. A drive mechanism 153J (FIG. 21) is connected to chain drive 152I, such as a motor mounted on cover 142J. Notably, it is contemplated that tool plate 44J could be made axially movable on conveyor shaft 49J, in which case a spring or biasing means would be included for biasing tool 40J toward conveyor screw flange 50J, such as between conveyor housing end plate 143J and sprocket 151J.

Thus, material handling apparatus including novel shredders for shredding agglomerated scrap material are provided. The shredders include teeth oriented toward the scrap material as the scrap material flows out of a scrap conveyor. The teeth are configured to shred agglomerated scrap material, but are configured to reduce jamming, to facilitate unjamming, and to provide low maintenance and long life. Further, the shredders are configured to allow ready maintenance and/or replacement, such as where a different shredder tool is preferred for handling a different agglomerated scrap material. In the foregoing description, it will be readily appreciated by those skilled in the art that modifications may be made to the invention without departing from the concepts disclosed herein. Such modifications are to be considered as covered by the following claims, unless these claims by their language expressly state otherwise.

The embodiments of the invention in which an exclusive property or privilege is claimed are defined as follows:

1. An apparatus for handling agglomerated scrap from a machining operation and the like, comprising:

a conveyor including a conveyor housing defining an outlet opening configured to deliver agglomerated metal scrap from a source of scrap to said outlet opening, and an auger having an end section at the outlet opening;

a metal scrap shredder including a shredder housing positioned at an output end of said conveyor housing, said metal scrap shredder including a tool having a plurality of teeth located proximate said outlet opening, said teeth being rotatable about an axis of rotation extending toward said outlet opening, said teeth being configured to tear apart and shred the agglomerated metal scrap against said end section of said auger at said outlet opening as the agglomerated metal scrap is output from said outlet opening; and a centrifuge positioned to receive shredded metal scrap from said shredder, said centrifuge being configured to remove liquid from the shredded metal scrap.

2. An apparatus as defined in claim 1 wherein said conveyor housing defines a longitudinal direction, said axis of rotation of said shredder tool being parallel said longitudinal direction.

3. An apparatus as defined in claim 2 including a delivery mechanism positioned in said conveyor housing defining a second axis of rotation, said second axis and said first axis being substantially co-linear.

4. An apparatus as defined in claim 1 wherein said tool includes a rotatable mounting plate, said teeth being secured to said mounting plate.

5. An apparatus as defined in claim 4 wherein said teeth are triangularly-shaped.

6. An apparatus as defined in claim 5 wherein said teeth include a first surface oriented generally parallel said axis for engaging and shredding the agglomerated metal scrap.

7. An apparatus as defined in claim 6 wherein said teeth include a second surface oriented at an angle to said axis, said second surface defining a trailing edge of said teeth as said teeth are rotated.

8. An apparatus as defined in claim 4 wherein said teeth comprise flexible fingers.

9. An apparatus as defined in claim 8 wherein said teeth include a coil spring section, said flexible fingers extending from said coil spring section.

10. An apparatus as defined in claim 4 wherein said teeth are axially movable.

11. An apparatus as defined in claim 10 wherein said mounting plate is axially moveable relative to said outlet opening of said conveyor housing.

12. An apparatus as defined in claim 4 wherein said mounting plate includes a release mechanism to prevent damage when jammed.

13. An apparatus as defined in claim 4 including a delivery mechanism positioned in said conveyor housing, said delivery mechanism including a shaft, said mounting plate of said tool being positioned on said shaft.

14. An apparatus as defined in claim 13 wherein said teeth comprise flexible fingers.

15. An apparatus as defined in claim 1 wherein said teeth comprise flexible fingers.

16. An apparatus as defined in claim 1 wherein said auger includes a flange having an end, and said teeth of said metal scrap shredder are located proximate said end of said flange to engage and shred the agglomerated metal scrap against said end of said flange as said tool is rotated.

17. An apparatus as defined in claim 16 including a scrap tearing member attached to said flange of said auger proximate a path defined by said teeth such that said teeth on said metal scrap shredder shear the agglomerated metal scrap against said scrap tearing member.

18. An apparatus as defined in claim 17 wherein said scrap tearing member includes a rake having second teeth.

19. An apparatus as defined in claim 1 including a reversible drive operably connected to said metal scrap shredder.

20. An apparatus as defined in claim 19 wherein said teeth include a trailing edge that is inclined, such that said teeth kick away a jammed article when said drive is reversed.

21. An apparatus as defined in claim 1 including a plunger positioned in said conveyor housing for moving the agglomerated metal scrap along said conveyor housing.

22. An apparatus as defined in claim 1 wherein said conveyor housing is oriented at an angle and includes an elongated chamber defining a gravity feed chute.

23. An apparatus as defined in claim 1 including a large piece separator for separating large pieces from shredded metal scrap, said large piece separator being operably connected to an output of said metal scrap shredder and being located upstream of said centrifuge.

24. An apparatus as defined in claim 1 wherein said shredder housing defines a shredder scrap outlet, and including a scrap-output-limiting mechanism for limiting the size of the shredded scrap exiting said shredder scrap outlet, whereby the agglomerated metal scrap exiting the shredded scrap outlet is reliably shredded to a predetermined size.

25. An apparatus as defined in claim 24 wherein said scrap-outlet-limiting mechanism includes retractable fingers positioned in said shredder scrap outlet.

26. An apparatus for handling agglomerated scrap from a machining operation and the like, comprising:
   a conveyor housing defining an outlet opening configured to deliver agglomerated metal scrap from a source of scrap to said outlet opening;
   a metal scrap shredder including a shredder housing positioned at an output end of said conveyor housing, said metal scrap shredder including a tool having a plurality of teeth located proximate said outlet opening, said teeth being rotatable about an axis of rotation extending into said outlet opening, and being configured to tear apart and shred the agglomerated metal scrap at said outlet opening as the agglomerated metal scrap is output from said outlet opening;
   a centrifuge positioned to receive shredded metal scrap from said shredder, said centrifuge being configured to remove liquid from the shredded metal scrap; and
   at least one scrap tearing anchor attached to one of said shredder housing and said conveyor housing proximate a path defined by said teeth for engaging and tearing the agglomerated metal scrap between said teeth and said at least one anchor.

27. An apparatus for shredding agglomerated elongated metal scrap comprising, in combination:
   a scrap conveyor for feeding agglomerated metal scrap, said scrap conveyor including an elongated conveyor housing defining a first scrap outlet and a delivery mechanism for moving agglomerated scrap along the conveyor housing to said outlet, said delivery mechanism including a flange located at said first scrap outlet; and
   a shredder comprising:
      a shredder housing including an inlet, said shredder housing being configured for attachment to said scrap conveyor with said inlet being located proximate said first scrap outlet, said shredder housing defining a shredder scrap outlet; and
      a scrap shredding tool rotatably supported in said shredder housing, said tool generally facing said first shredder scrap outlet and including a plurality of shredding teeth configured to tear apart and shred the elongated metal scrap being fed into said shredder housing, said teeth protruding from said rotatable scrap shredding tool generally toward said first outlet and being movable along a path that passes close to said flange so that agglomerated scrap engages and is shredded by said shredding teeth against said flange as said scrap exits said first outlet.

28. A shredder as defined in claim 27 wherein said rotatable tool includes a clutch mechanism for angularly releasing said tool when said tool jams against an object.

29. A shredder as defined in claim 27 wherein said teeth are triangularly-shaped.

30. A shredder as defined in claim 29 wherein said rotatable tool is reversible to unjam said rotatable scrap shredding tool.

31. A shredder as defined in claim 27 including a scrap-output-limiting mechanism for limiting the size of shredded scrap exiting said shredded scrap outlet to a maximum predetermined size, whereby the agglomerated metal scrap exiting the shredded scrap outlet is optimally shredded before exiting said metal scrap shredder.

32. A shredder as defined in claim 31 wherein said scrap-outlet-limiting mechanism includes retractable fingers positioned in said shredded scrap outlet.

33. A shredder as defined in claim 27 wherein said teeth comprise flexible members.

34. A shredder as defined in claim 33 wherein said teeth comprise flexible fingers.

35. A shredder as defined in claim 34 wherein said teeth include a coil spring section, said flexible fingers extending from said coil spring section.

36. A shredder as defined in claim 27 wherein said delivery mechanism includes a shaft, and said tool includes a plate mounted on said shaft.

37. A material handling apparatus for handling agglomerated metal scrap from a machine process, comprising:
   a screw conveyor for delivering liquid laden agglomerated metal scrap from a machining operation, the conveyor having a delivery screw, an elongated housing, and a discharge end; and
   a shredding device including a rotatable tool holder defining an axis of rotation oriented in-line with the elongated housing of the conveyor and located proximate the discharge end thereof, the rotatable tool holder including axially extending teeth configured to tear against a leading edge of the delivery screw as the tool holder is rotated and as said conveyor is operated to deliver the agglomerated metal scrap.

38. A material handling apparatus as defined in claim 37 wherein said shredding device includes a shredder housing, and further including second teeth attached to one of said delivery screw and said shredder housing, the rotatable tool holder being rotatable so that said shredder teeth shearingly engage the agglomerated metal scrap and pull the agglomerated metal scrap against the second teeth thus causing shredding to occur.

39. A material handling apparatus as defined in claim 37 wherein said rotatable tool holder is axially moveable such that the rotatable tool holder can be moved away from an object that has caused the tool holder to jam.

40. A material handling apparatus as defined in claim 37 wherein said rotatable tool holder is reversible.

41. A material handling apparatus as defined in claim 40 wherein said teeth comprise flexible fingers.

42. A conveyor for moving agglomerated scrap comprising:

an elongated housing having a pair of side walls and a bottom wall connecting said side walls;

a screw having a spirally extending flange for moving agglomerated scrap along said housing as said screw is rotated, said bottom wall being configured to mateably receive said screw, said flange having an outer edge defining a zone within which said flange operates as said screw is rotated; and a beam attached to one of said side walls, said beam extending longitudinally along one of said side walls and including a leg protruding from said one side wall toward said zone, said beam providing longitudinally moving pinch points with said edge of said flange as said screw is turned so that some of the agglomerated material is trapped around the pinch points and forced to move along the housing longitudinally, whereby the agglomerated scrap is moved longitudinally instead of undesirably spinning in said housing with the screw.

43. A conveyor as defined in claim 42 wherein said side walls comprise generally planar sections.

44. A conveyor as defined in claim 43 wherein a portion of said side walls are parallel.

45. A conveyor as defined in claim 43 wherein a portion of said side walls are non-parallel.

46. A conveyor as defined in claim 42 wherein said beam is L-shaped, said leg forming a part of the L shape.

47. A conveyor as defined in claim 42 wherein said leg extends generally tangentially toward said zone as said screw is turned.

48. A method of shredding agglomerated scrap comprising steps of:

providing a conveyor having a delivery system including a screw defining a longitudinal axis and a discharge located at a longitudinal end of the conveyor;

providing a shredder having teeth rotatable about an axis extending generally parallel the longitudinal axis, the teeth being located proximate an end of said screw at said discharge;

discharging agglomerated scrap from said discharge by operating said delivery mechanism;

rotating said shredder teeth to shred the agglomerated scrap against said end of said screw as the agglomerated scrap exits said discharge; and separating liquid from shredded scrap supplied from said shredder.

* * * * *

UNITED STATES PATENT AND TRADEMARK OFFICE
CERTIFICATE OF CORRECTION

PATENT NO. : 5,722,604
DATED : March 3, 1998
INVENTOR : Russell D. Dudley

It is certified that error appears in the above-identified patent and that said Letters Patent is hereby corrected as shown below:

Column 5, line 64;

"tom" should be --torn--.

Column 7, line 11;

"ff" should be --if--.

Column 8, line 36;

"301" should be --30I--.

Column 8, line 50;

"132I" should be --132J--.

Column 8, line 59;

"138I" should be --138J--.

Column 8, line 63;

"138I" should be --138J--.

Column 9, line 3;

"Optionally" should be --Optimally--.

Column 9, line 8;

"139I" should be --139J--.

UNITED STATES PATENT AND TRADEMARK OFFICE
CERTIFICATE OF CORRECTION

PATENT NO. : 5,722,604
DATED : March 3, 1998
INVENTOR : Russell D. Dudley

It is certified that error appears in the above-identified patent and that said Letters Patent is hereby corrected as shown below:

Column 9, line 15;

"140I" should be --140J--.

Column 9, line 17;

"38I" should be --38J--.

Column 9, line 27;

"137I" should be --137J--.

Column 9, line 42;

"152I" should be --152J--.

Signed and Sealed this

Twenty-fifth Day of August, 1998

BRUCE LEHMAN

Attest:

Attesting Officer

Commissioner of Patents and Trademarks